W H. ALDRIDGE.
WATER HEATER.
APPLICATION FILED AUG. 2, 1919.

1,418,421.

Patented June 6, 1922.
2 SHEETS—SHEET 1.

Inventor.
W. H. Aldridge.
by Lacey & Lacey
his Atty's

W. H. ALDRIDGE.
WATER HEATER.
APPLICATION FILED AUG. 2, 1919.

1,418,421.

Patented June 6, 1922.
2 SHEETS—SHEET 2.

Inventor:
W. H. Aldridge
by Lacey & Lacey
his Att'ys.

UNITED STATES PATENT OFFICE.

W HERBERT ALDRIDGE, OF PORTLAND, OREGON.

WATER HEATER.

1,418,421. Specification of Letters Patent. Patented June 6, 1922.

Application filed August 2, 1919. Serial No. 314,851.

*To all whom it may concern:*

Be it known that I, W HERBERT ALDRIDGE, citizen of Canada, residing at Portland, in the county of Multnomah and State of Oregon, have invented certain new and useful Improvements in Water Heaters, of which the following is a specification.

This invention relates to an improved water heater or furnace especially adapted for use in connection with hot water heating systems and has as one of its principal objects to provide a heater wherein, in proportion to the size of the heater, a maximum water heating surface will be presented to the heat generated.

A further object of the invention is to provide a water heater wherein the water to be heated will be caused to flow around the combustion chamber of the heater and directly over said chamber for thus obtaining maximum heating results from a given amount of fire in the chamber.

And the invention has as a still further object to provide a water heater which will be entirely efficient, which may be constructed of sheet metal and may accordingly be produced at minimum cost.

Other and incidental objects will appear hereinafter. In the drawings.

Figure 1:
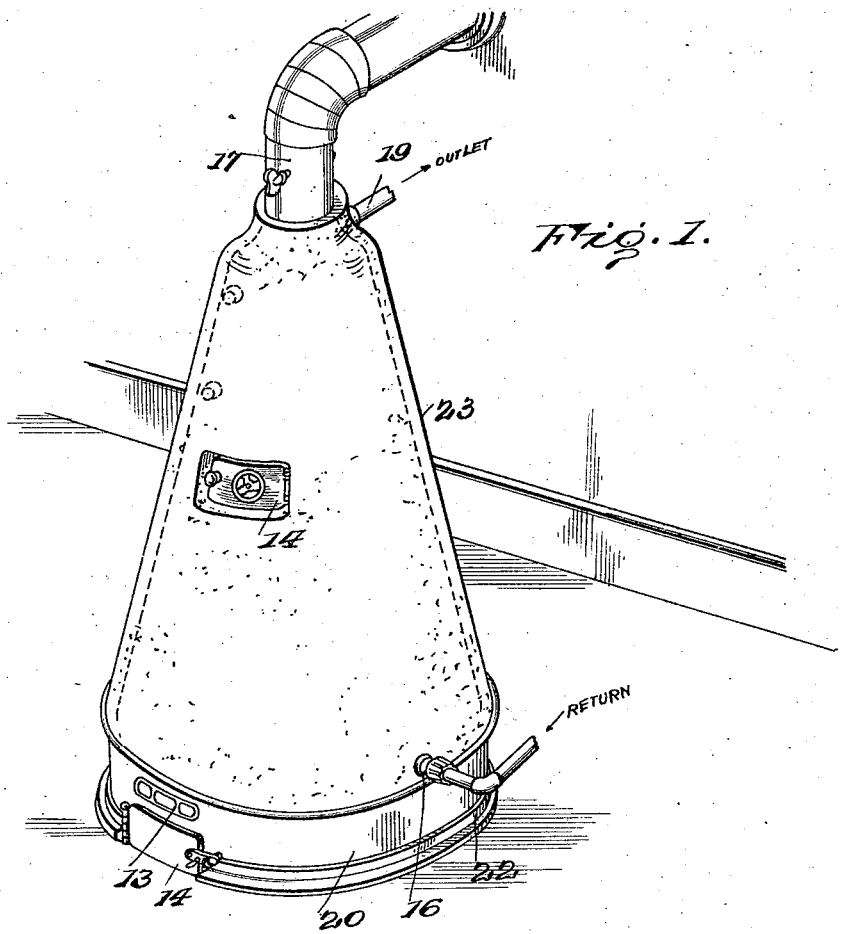
Figure 1 is a perspective view of my improved heater.
Figure 2:
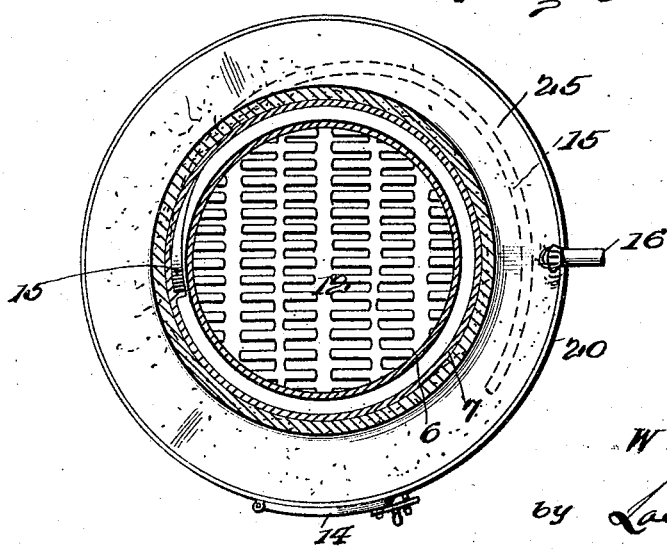
Figure 2 is a horizontal sectional view taken through the lower portion of the heater.
Figure 3:
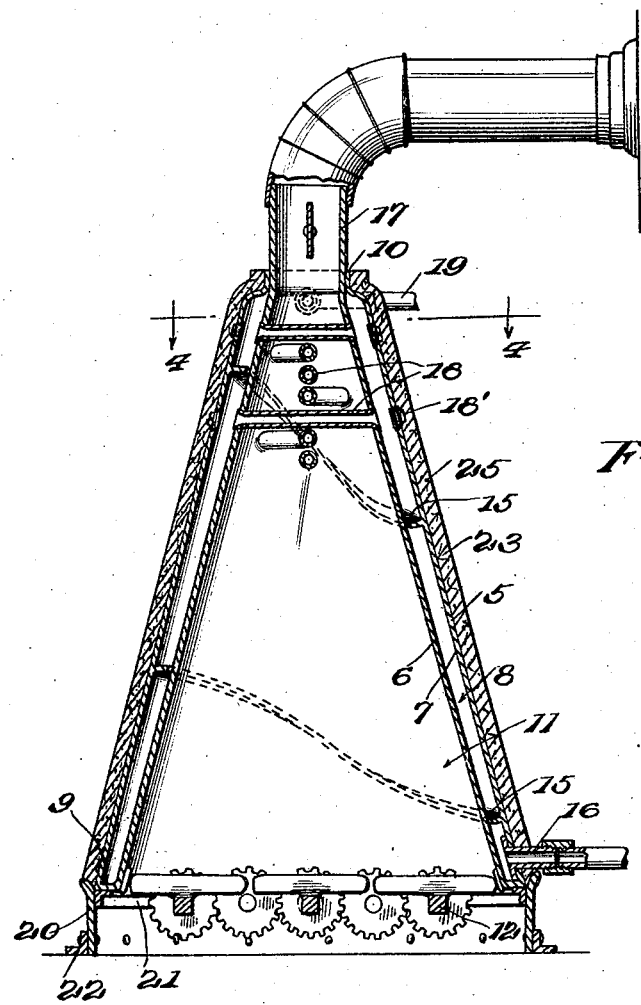
Figure 3 is a central vertical sectional view taken through the device.
Figure 4:
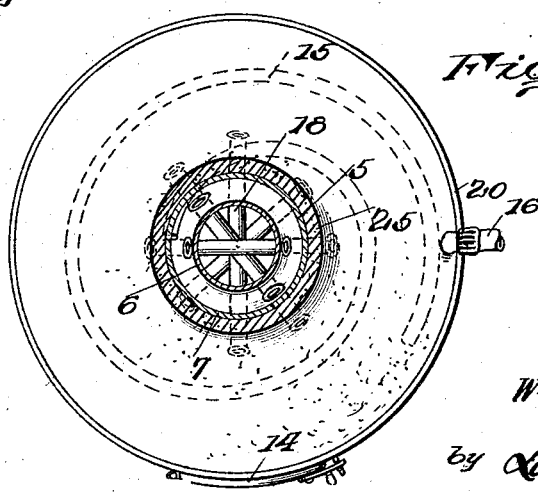
Figure 4 is a horizontal section taken on the line 4—4 of Figure 3.

Referring now more particularly to the drawings, I employ a hollow conical casing 5 which is constructed of inner and outer shells 6 and 7 respectively. The shells define a water chamber 8 therebetween and are connected at their lower ends by an annular plate 9 while at the upper ends of the shells, the outer shell is flanged inwardly and is welded to the inner shell as indicated at 10 for connecting the shells. The inner shell forms a conical combustion chamber 11 and at the lower end of this chamber is suitably mounted a grate 12 which may be of any approved type. A slot 13 through the casing is provided to receive a grate shaker and above this slot is arranged a fire door opening which is preferably provided by flanging the adjacent portions of the inner and outer shells toward each other and welding such portions of the shells together. The fire door opening is arranged a sufficient distance above the grate to permit the grate to carry a good body of fire and normally closing said opening is a fire door 14. Mounted within the water chamber 8 is a spirally arranged baffle plate 15 suitably secured to the outer shell 7 and closely approaching the inner shell, the space between the plate and the inner shell being sufficient, however, to prevent blistering of this shell. To compensate for the reduced capacity of the upper portion of the water chamber the shells are spaced a greater distance apart at their upper portions than at their lower portions, the shells gradually diverging toward their upper ends, and in this connection it is to be observed that the baffle plate 15 is gradually increased in width proportionately toward its upper end so that the plate is, throughout its length, spaced a uniform distance from the inner shell. A return pipe 16 extends through the outer shell at the lower end of the casing and discharges into the lower portion of the water chamber beneath the lower end portion of the baffle plate whereby the water flowing into said chamber will be directed upwardly immediately upon entering the chamber.

Integrally formed on the inner shell 6 at its upper end is a discharge stack 17 and, as will now be clear, the products of combustion will be concentrated within the reduced upper portion of the combustion chamber 11 before finally flowing out through said stack. Extending transversely across the upper end portion of the combustion chamber is a plurality of superposed water tubes 18 connected at their ends to the inner shell and opening into the water chamber. In order that these tubes may be renewed suitable plugs 18' are removably fitted in the outer shell in alinement with said tubes. The tubes are arranged in angular relation with respect to each other and, as will be clear, will retard the flow of the products of combustion through the combustion chamber at the upper portion of said chamber. Communicating with the upper portion of the water chamber is an outlet pipe 19.

Supporting the casing 5 is a foundation ring 20 providing an ash pit. This ring is flared outwardly at its upper margin and secured within the ring is an angle plate 21 upon which the casing is removably rested.

A similar angle plate 22 is also preferably provided exteriorly of the ring at its base. Surrounding the casing and supported by the flared upper margin of the foundation ring is a packing 23. This packing may be formed of any approved material and is suitably secured to the casing.

In practical use, a suitable supply tank arranged at an elevated point in the building in which the heater is installed, is connected with the return pipe 16 in such manner that water will be automatically fed from the tank through said pipe for augmenting the water returning in the pipe. Thus, the heater will be properly supplied with water and, of course, as the water in the lower portion of said chamber is heated, the water will rise upwardly within the chamber. As the water rises it will be caused to flow around and around the inner shell 6 by the baffle plate 15 and consequently, in its flow will be caused to encircle the combustion chamber. In this way the water will be brought into contact with a maximum heated surface so that but a small amount of fire will be required to properly heat the water. Furthermore, it will be seen that the water, upon reaching the upper end portion of the water chamber, will flow through the water tubes 18 and will thus pass directly over the fire. Thus, after the water has been initially heated at the bottom portion of the water chamber, the water will be subjected to the concentrated heat in the upper portion of said chamber at the point where the outward flow of the products of combustion through the chamber is retarded or checked by said tubes for effectually heating the water before flowing out through the outlet pipe at the top of the chamber.

Having thus described the invention, what is claimed as new is:

A water heater comprising a conical casing consisting of inner and outer conical shells connected at their lower ends and slightly diverging toward their upper ends to provide an intermediate water chamber, the upper extremity of the outer shell being flared inwardly and connected to the inner shell and the upper extremity of said inner shell being extended upwardly beyond the outer shell to form a discharge stack having a damper therein, a smoke flue connected with the stack, a grate supported in the lower end of the inner shell, a plurality of water tubes extending diametrically across the upper end of the inner shell immediately below the stack and communicating with the interior of the water chamber, a spiral baffle plate arranged within the water chamber and extending from end to end thereof, said baffle plate gradually increasing in width from the bottom to the top of the casing and having one edge thereof secured to the outer shell and its other edge spaced uniformly from the inner shell, an outlet leading from the outer shell at a point above the water tubes, and a return pipe leading into said outer shell at a point immediately below the lower end of the baffle plate.

In testimony whereof I affix my signature.

W HERBERT ALDRIDGE. [L. S.]